United States Patent [19]
Gupta et al.

[11] Patent Number: 5,689,556
[45] Date of Patent: Nov. 18, 1997

[54] METHOD OF DETECTING NARROW-BAND SIGNALS IN AN ECHO CANCELLER

[75] Inventors: Prabhat K. Gupta; Sanjay Gupta, both of Germantown, Md.

[73] Assignee: Hughes Electronics, Los Angles, Calif.

[21] Appl. No.: 528,762

[22] Filed: Sep. 15, 1995

[51] Int. Cl.$^6$ .................................................. H04B 3/23
[52] U.S. Cl. .............................. 379/410; 379/3; 379/406; 379/386; 370/286; 370/287
[58] Field of Search ........................... 379/406, 407, 379/410, 411, 3, 386, 344, 345, 346; 370/32.1, 286–292

[56] References Cited

U.S. PATENT DOCUMENTS

| | | | |
|---|---|---|---|
| 4,426,729 | 1/1984 | Gritton | 379/406 X |
| 4,584,441 | 4/1986 | Chance et al. | 379/345 X |
| 4,658,420 | 4/1987 | Fukushiri et al. | 379/407 |
| 4,912,758 | 3/1990 | Arbel | 379/388 |
| 5,029,204 | 7/1991 | Shenoi et al. | 379/407 |
| 5,321,745 | 6/1994 | Drory et al. | 379/386 X |
| 5,325,425 | 6/1994 | Novas et al. | 379/386 X |
| 5,390,244 | 2/1995 | Hinman et al. | 379/386 |
| 5,408,529 | 4/1995 | Greaves | 379/386 |
| 5,420,921 | 5/1995 | Lahdemaki | 379/407 |
| 5,428,680 | 6/1995 | Murata et al. | 379/386 |
| 5,428,681 | 6/1995 | Andre | 379/411 X |
| 5,519,744 | 5/1996 | Battista et al. | 379/386 |
| 5,528,663 | 6/1996 | Locke et al. | 379/386 X |
| 5,588,052 | 12/1996 | Murata et al. | 379/386 X |
| 5,592,548 | 1/1997 | Sih | 379/410 |

*Primary Examiner*—Krista M. Zele
*Assistant Examiner*—Devendra T. Kumar
*Attorney, Agent, or Firm*—John T. Whelan; Wanda Denson-Low

[57] ABSTRACT

A method of detecting narrow-band signals in an echo canceller to control the coefficient update process, echo suppression process, and the disablement of the echo canceller is provided. The method includes the steps of searching for the presence of a generic tone, searching for DTMF tones, searching for a 2100 Hz tone and, if a generic tone is found, searching for a dial tone. If a generic tone is detected on the far end signal, a tone flag is set which triggers the disablement of the echo canceller coefficient update process and the enablement of the echo suppressor process. If a 2100 Hz tone is detected, the echo canceller is disabled. If a DTMF signal is detected, DTMF flags are set which are used by the echo suppressor for suppressing the near end echo. Finally, if a dial tone is detected, dial tone flags are set which cause the disablement of the echo suppressor.

14 Claims, 7 Drawing Sheets

METHOD OF DETECTING NARROW-BAND SIGNALS IN AN ECHO CANCELLER

BACKGROUND OF THE INVENTION

The present invention describes a method for detecting narrow-band signals in echo cancellers. Narrow-band signals are used in telecommunications applications for trunk signalling and subscriber signalling.

Narrow-band signals used for subscriber signalling, such as dialtones and the dual-tone multifrequency (DTMF) tones representative of touchtone phone digits, can disrupt the operation of an echo canceller. This disruption may be in the form of echoes and false convergence caused when these narrow-band signals are applied to an echo canceller in an unconverged state. Even when an echo canceller is converged, some signals can cause the echo canceller to converge to a wrong state. An example of this type of signal is the 2100 Hz tone typically used by modems and facsimile machines.

Trunk signals, such as R1 signaling, are applied to the signal path prior to completion of the circuit to the end two wire echo path. Echo cancellers can also distort some of these trunk signals if they do not detect near end speech fast enough. It is essential that the convergence time of echo cancellers not be affected by the presence of narrow-band signals and that it not diverge for tones that are applied after convergence. Also, the narrow-band signals should not be distorted by the echo canceller and their echoes should be effectively suppressed. Typically, echo cancellers lack special techniques for dealing with narrow-band signals, resulting in undesired echoes and degradation in echo canceller performance.

Accordingly, a method of identifying narrow-band signals is necessary such that the performance of the echo canceller is not adversely affected and the signals are not distorted.

SUMMARY OF THE INVENTION

The present invention provides a method for searching for narrow-band signals in an echo canceller to control the coefficient update process and echo suppression process in addition to the detection of a 2100 Hz signal used to disable the echo canceller. The method includes the steps of searching for a generic tone and a dialtone in signals reaching the echo canceller. If any generic tone is detected on the far end signal, the echo canceller filter coefficient update process is disabled and the echo suppressor process is enabled. According to one aspect of the invention, the method also includes the steps of searching for a DTMF tone and a 2100 Hz tone. Incoming signals are constantly being monitored for DTMF tones. A separate set of filters is used to detect DTMF tones because the short duration of these tones requires a faster response time. If a dialtone is detected on the far end signal, the echo suppressor process is disabled to let the near end DTMF signals pass through without clipping.

DETAILED DESCRIPTION OF THE DRAWINGS

The presently preferred method implements multiple detectors to improve narrow-band signal detection and echo canceller operation. There are multiple, and preferably four, different tone detectors in the echo canceller. The detectors are capable of meeting CCITT G.164 specifications, helping disable foreground filter updates and helping to activate/deactivate the echo suppressor under certain conditions.

Figure 1:
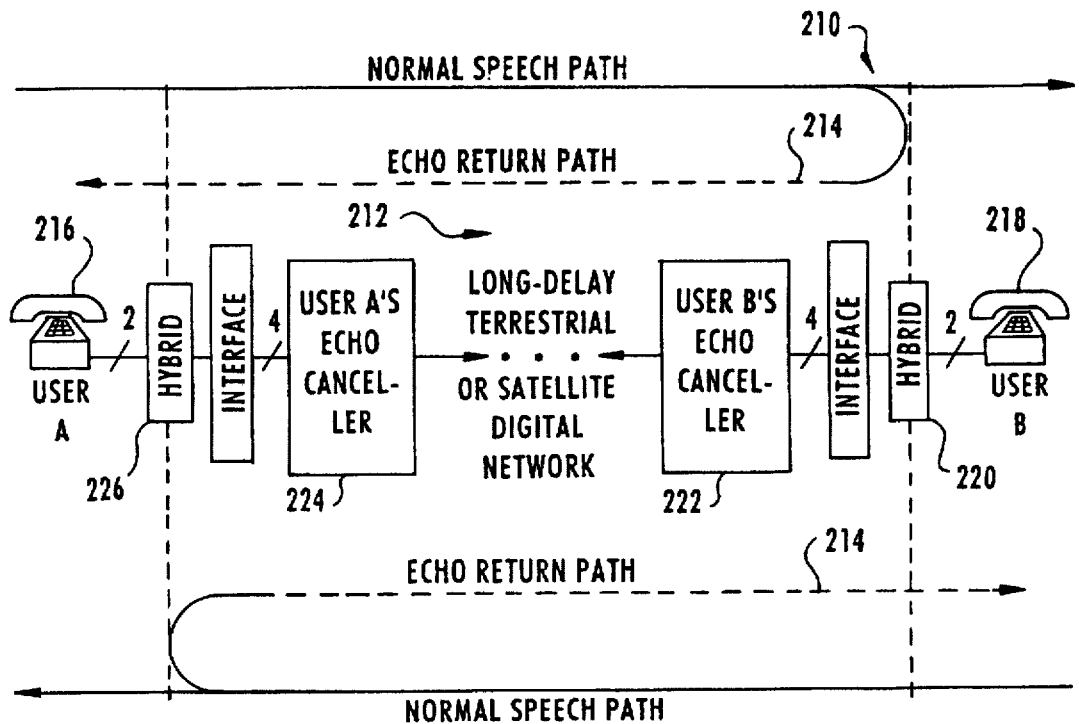
FIG. 1 is a block diagram illustrating a generic bidirectional transmission path in a communications system.

An echo canceller acts to filter or cancel out reflected signals that are generated in telephone communications. As background for the environment the presently preferred method may operate on, FIG. 1 illustrates a generic bidirectional transmission path. In a typical telephone conversation between two users communicating over a telephone network, echoes 214 made up of reflected energy may develop. If user A 216 speaks, part of the signal passes through the network 212 to user B 218 and part of the signal will often reflect back from the 4 wire to 2 wire hybrid 220 near user B. User B's echo canceller 222, operating properly, will filter out and suppress speech reflected back to user A from the hybrid 220. User A's echo canceller 224 operates to filter and suppress user B's speech reflected off of the hybrid 226 near user A. The method of the present invention may operate within the echo cancellers 222, 224 shown in FIG. 1.

Figure 2:
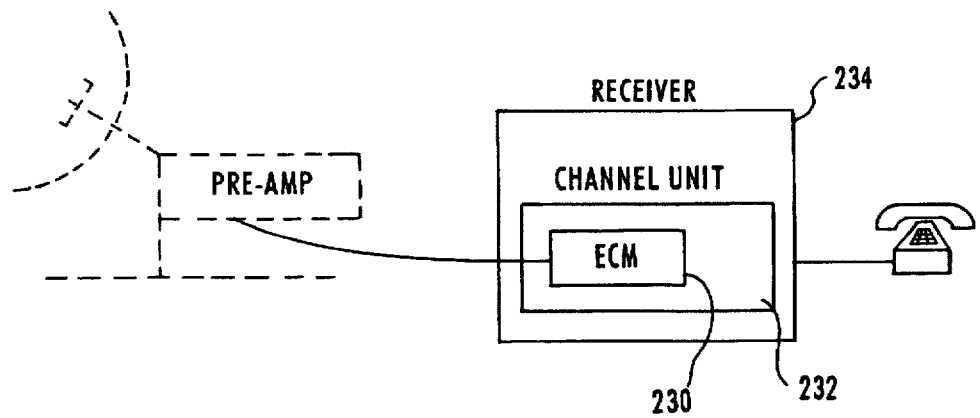
FIG. 2 is a block diagram of a satellite telephony ground station receiver that may be used with the method of the present invention.

A preferred embodiment of the present invention operates on an echo canceller module (ECM), which is a part of a channel unit in a satellite telephony ground station. Referring to FIG. 2, a satellite telephony ground station receiver 234 is shown having a channel unit 232 and an echo canceller module 230 inside the channel unit 232. The present method may be performed on a digital signal processor (DSP) in the echo canceller module 230. A Texas Instruments TMS C31 is one type of DSP which may be used. Because the voice quality of a satellite telephony network may be improved significantly, the network may replace terrestrial networks in many applications. The presently preferred embodiment may also be incorporated in any wireless communication system or land line network.

Figure 3:
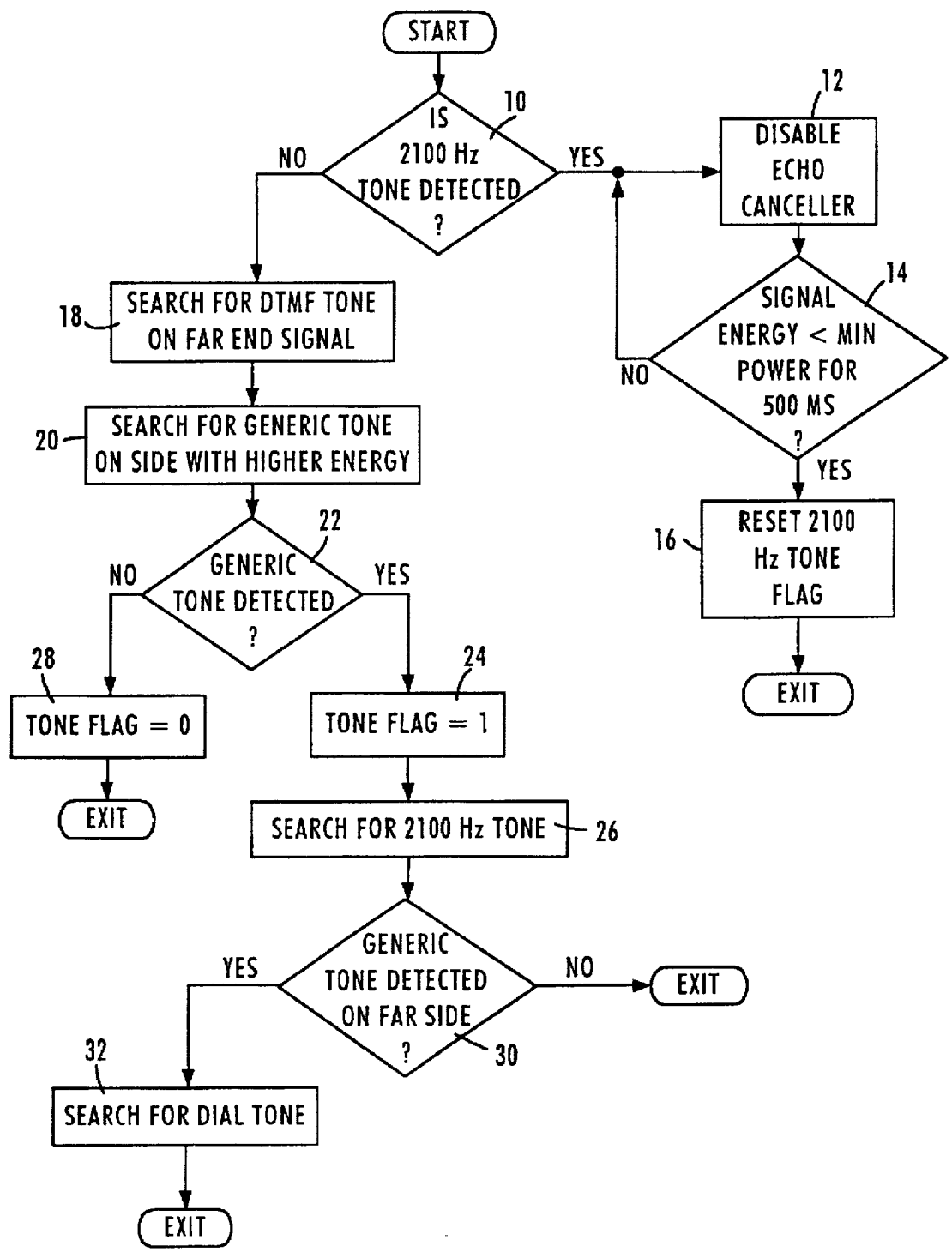
FIG. 3 is a flow diagram illustrating a preferred method of detecting narrow-band signals in an echo canceller according to the present invention.

FIG. 3 illustrates the basic steps of the presently preferred method. A 2100 Hz tone is first searched for 10 in the echo canceller. If a 2100 Hz tone is detected in the signals passing through the echo canceller, the echo canceller is disabled 12. The 2100 Hz detector continues to instruct 14 the echo canceller to disable itself until the signal drops below a predetermined minimum power level for 500 milliseconds in both directions. Once the energy has remained below the minimum power level for 500 milliseconds, the 2100 Hz tone flag is 16 reset. The echo canceller also constantly searches 18 for dual-tone multifrequency (DTMF) tones in the far end signals. If a DTMF tone is detected, the echo suppressor is temporarily disabled to allow the tones to pass undisturbed.

The present method also searches 20 for a generic tone. When a generic tone is detected 22, a tone flag 24 is set to 1 and a 2100 Hz signal is 26 again searched for by the echo canceller. If no generic tone is detected 22, a tone flag is set to zero 28. Assuming a generic tone was detected 22, the generic tone detector determines 30 what side, near end or far end, the tone is coming from. If the tone came from the far end, then the echo canceller searches for a dialtone 32.

Generic Tone Detector

This tone detector is a general purpose tone detector which detects a tone based on the ratio of average value to maximum value of the input signal for a given 10 millisecond frame. The tone may be coming from the far end or the near end of the communication link. The far end refers to the side of the communications link furthest from the echo canceller of interest. The near end refers to the side of the communications link nearest to the echo canceller of interest. The direction in which to look for the tone is governed by the side having the higher power. Once direction is determined, the highest average power and amplitude in a 10 msec period is saved in peak_power and peak_input variables. After 10 msec, based on the logic shown in FIG. 4, a tone is declared present or not. A tone-flag is set when the peak present count reaches 20 and reset when it drops below 8. It can take up to 200 msec to detect a tone. This detector, because of its simplicity, takes a long time to detect a tone but its false detects are very low because of the time duration for which all tests must pass is relatively high. The tone_flag is used to disable coefficient updates in the echo canceller.

Figure 4:
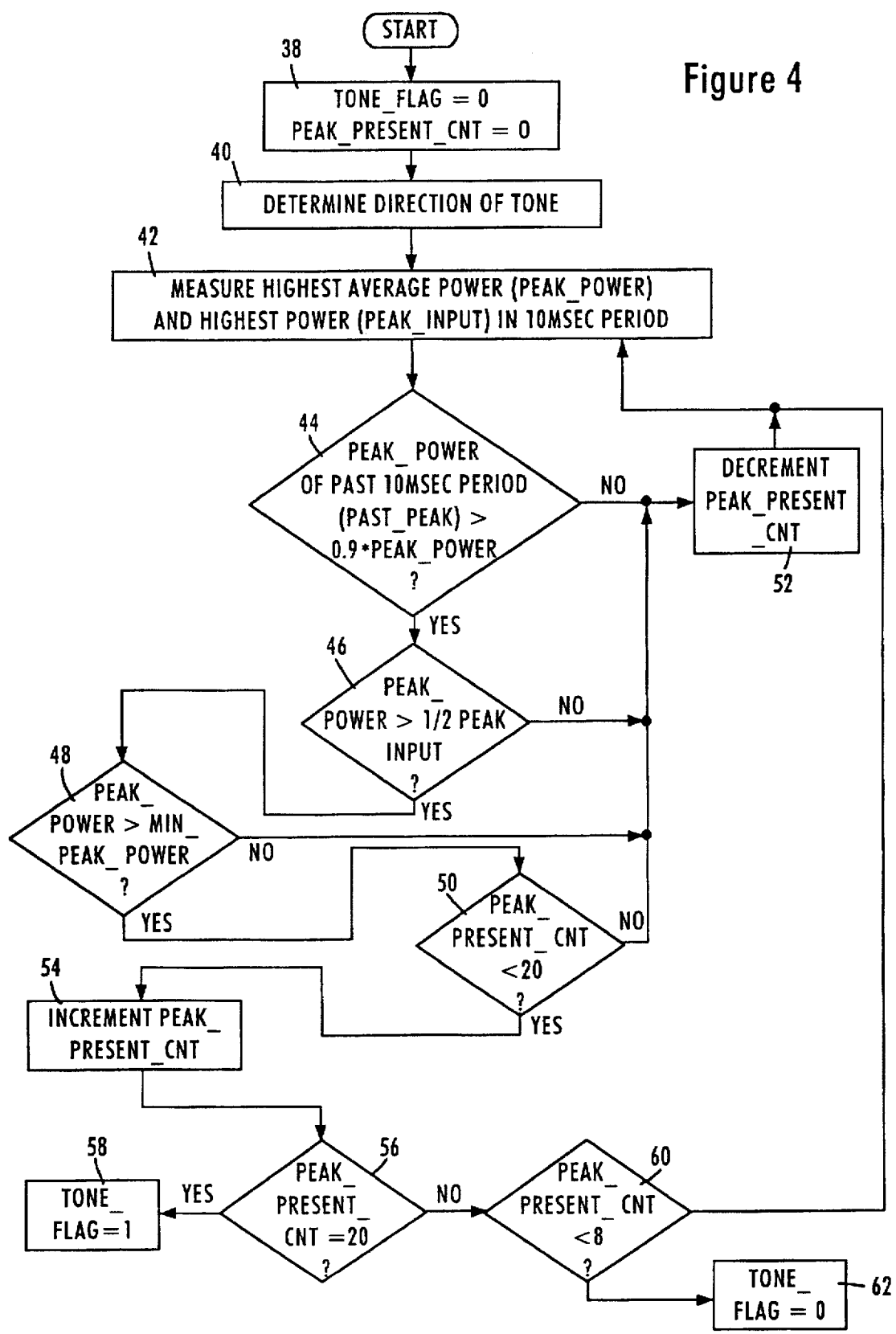
FIG. 4 is a flow diagram detailing a preferred process for detecting a generic tone for use in the method of FIG. 3.

Referring to FIG. 4, a more detailed chart is shown of the generic tone detection process. A tone_flag and peak_present_cnt variable are each set to zero 38 initially. Next, the detector determines 40 the direction, near end or far end, that the potential tone is originating from. Over a 10 millisecond frame, the generic tone detector measures 42 the highest average power (peak_power) and the highest sample value of the potential tone.

As is shown in FIG. 4, if the power from the past 10 millisecond (past_peak) is greater than or equal to 90% of the present average power, the present average power is greater 46, 48 than both the minimum power threshold (min_peak_power) and half of the peak value, and the peak_present_cnt variable is less than 20, the peak_present_cnt variable is incremented 54 by one. Otherwise, the peak_present_cnt is decremented 52 by one and measurement in another 10 millisecond frame of information is made 42. In one preferred embodiment, the min_peak_power is −30 dBmo. A tone_flag is set 58 to 1, indicating a tone is present, if the counter reaches 20. Conversely, the tone_flag is set 62 to zero if the counter drops below 8.

2100 Hz Tone Detector

Figure 5:
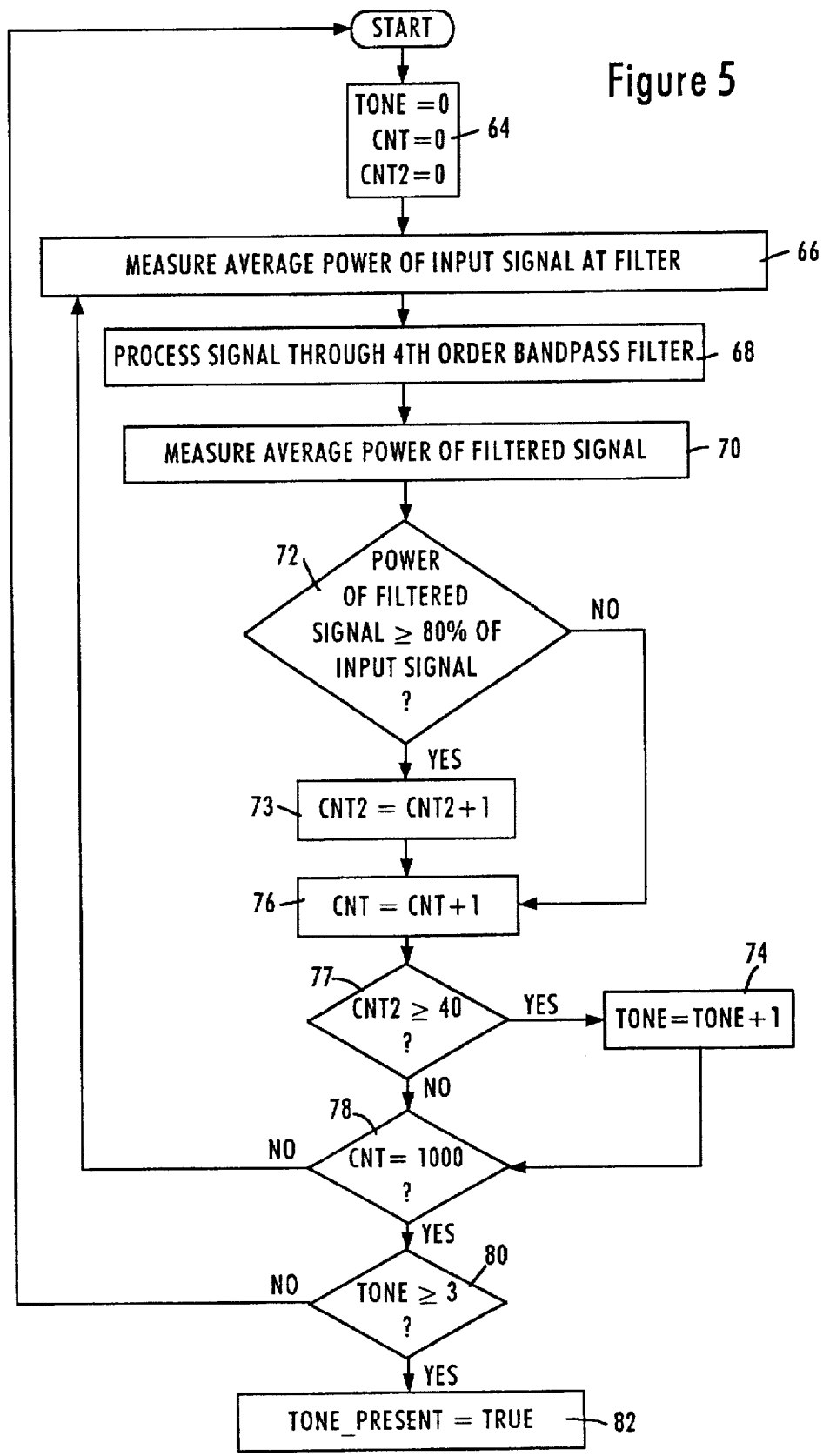
FIG. 5 is a flow diagram detailing a preferred process for detecting a 2100 Hz tone for use in the method of FIG. 3.

FIG. 5 best shows a preferred method for detecting a 2100 Hz tone. A variable for indicating tone presence (tone), a first counter (CNT), and a second counter (CNT2) are initialized 64 at the beginning of the search process. The signal received at the echo canceller is then measured 66 for average power at the input of a bandpass filter, preferably a 4th order bandpass. After the initial measurement, the detector processes 68 the signal through the filter. The 4th order bandpass filter is preferably centered around 2100 Hz on the input signal. If the filter output average reaches 80% of the filter input average, the second counter (CNT2) is 73 incremented. If 77 the power of the filtered signal remains at or above the 80% mark for five milliseconds (40 samples) a tone counter is 74 incremented. The first counter is incremented 76 each cycle to monitor the amount of elapsed time. The tone counter must be incremented within a 125 millisecond time frame (1000 samples) 78 or the 2100 Hz detector resets the counters and begins the measurement loop again. This process is repeated four times. If 80 the tone counter is incremented in three out of four 125 millisecond frames, the tone is declared present 82. Each frame may be less than 125 milliseconds because the filter output average may reach 80% of the input average in less than the 125 millisecond search time. If a tone is detected, the filter is turned off.

As required by G.164 this detector is used to detect a 2100 Hz tone which is usually generated by a FAX machine or MODEM to disable the echo canceller. It can detect both continuous and phase-reversed tones though it cannot differentiate between the two. The generic tone detector passes information on the direction from which the tone is originating to the 2100 Hz detector.

Once the 2100 Hz tone is identified, the echo canceller looks for pure energy over the entire communication band width. If the energy in both the directions goes below a threshold (MIN_POWER) for one unbroken 500 msec period, the tone is considered off. Preferably, the MIN_POWER is −30 dBmo.

DTMF Tone Detector

Figure 6:
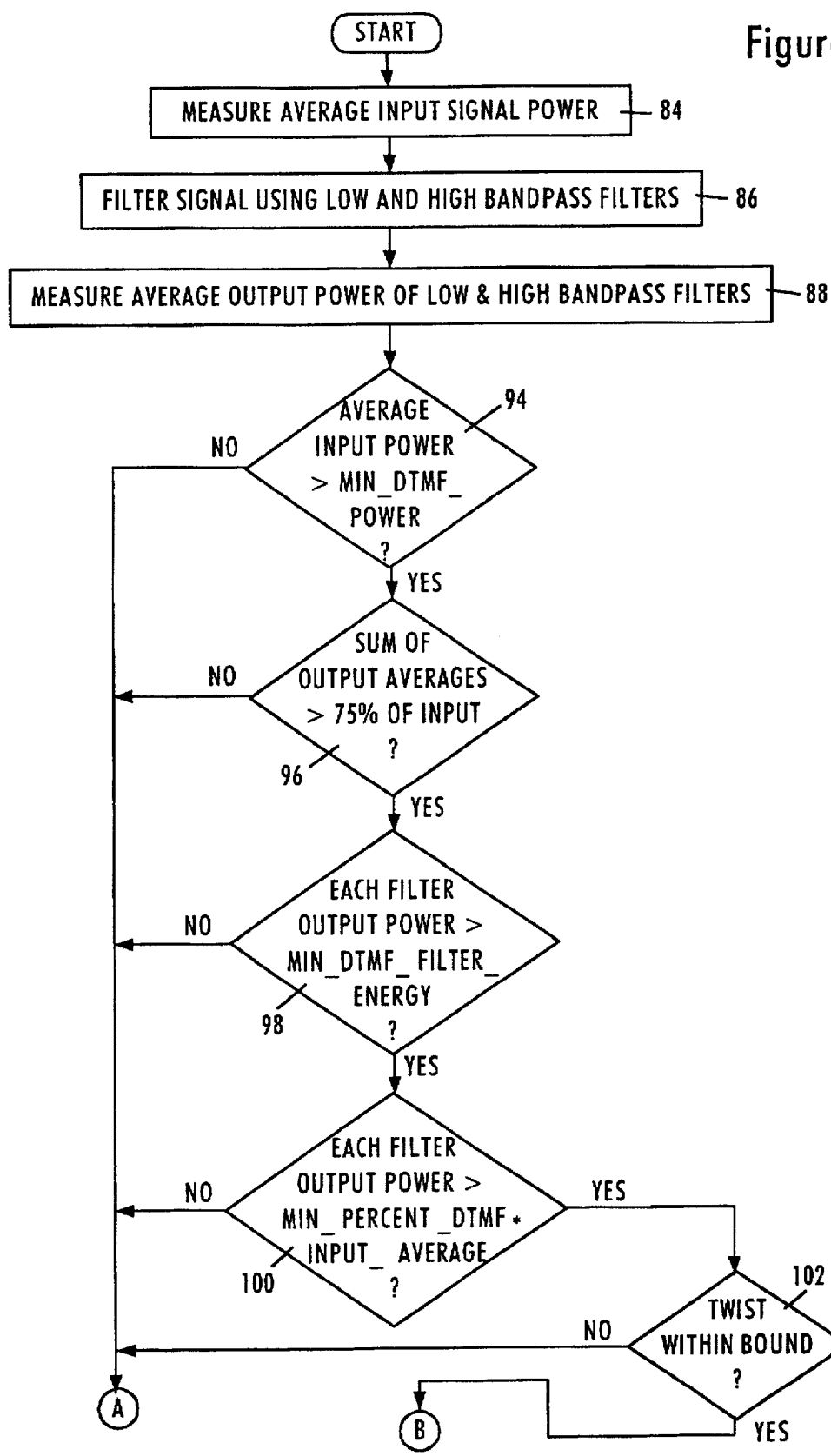
FIG. 6 is a flow diagram detailing a preferred DTMF tone detection process for use in the method of FIG. 3.
Figure 7:
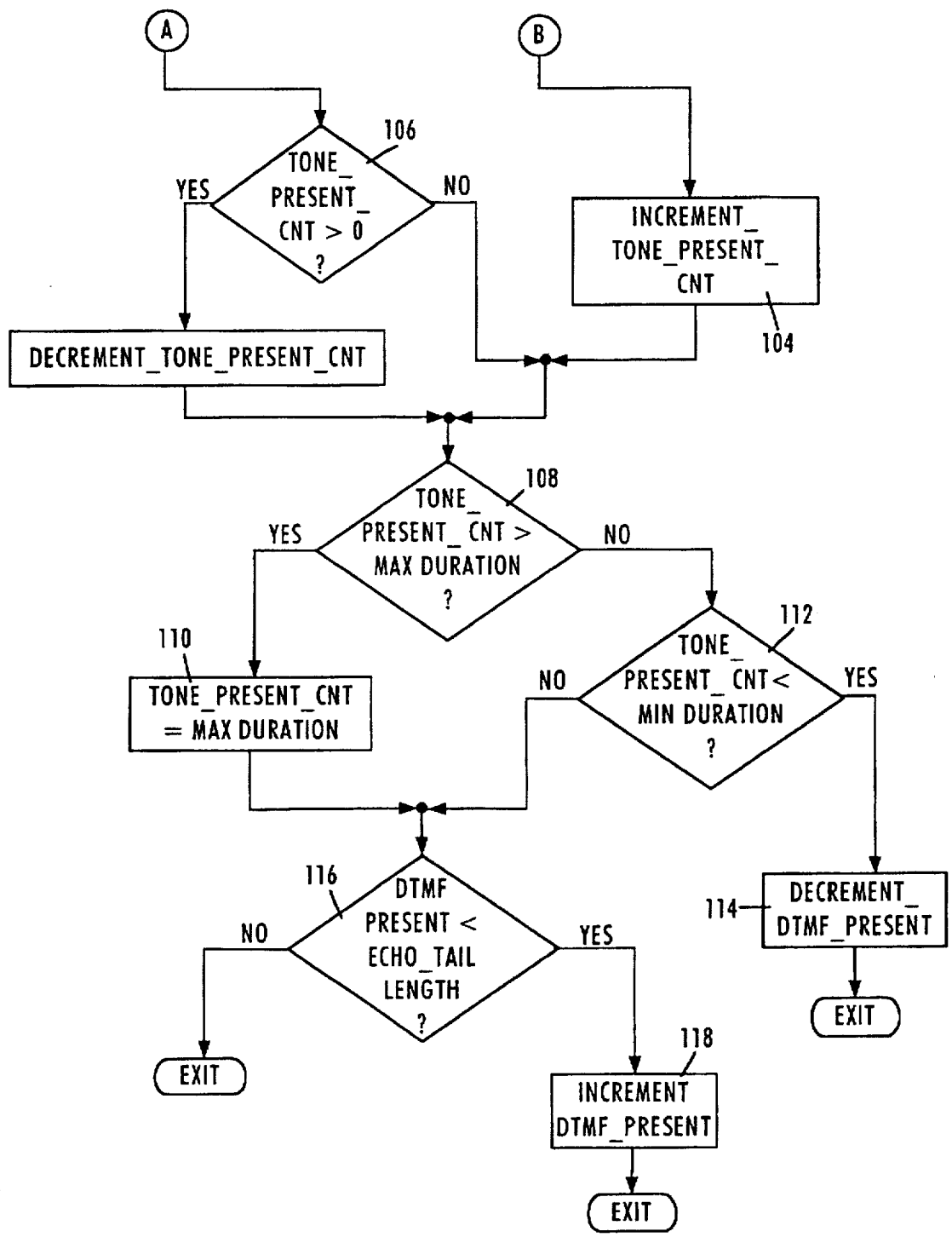
FIG. 7 is a continuation of the flow diagram of FIG. 6.
Figure 8:
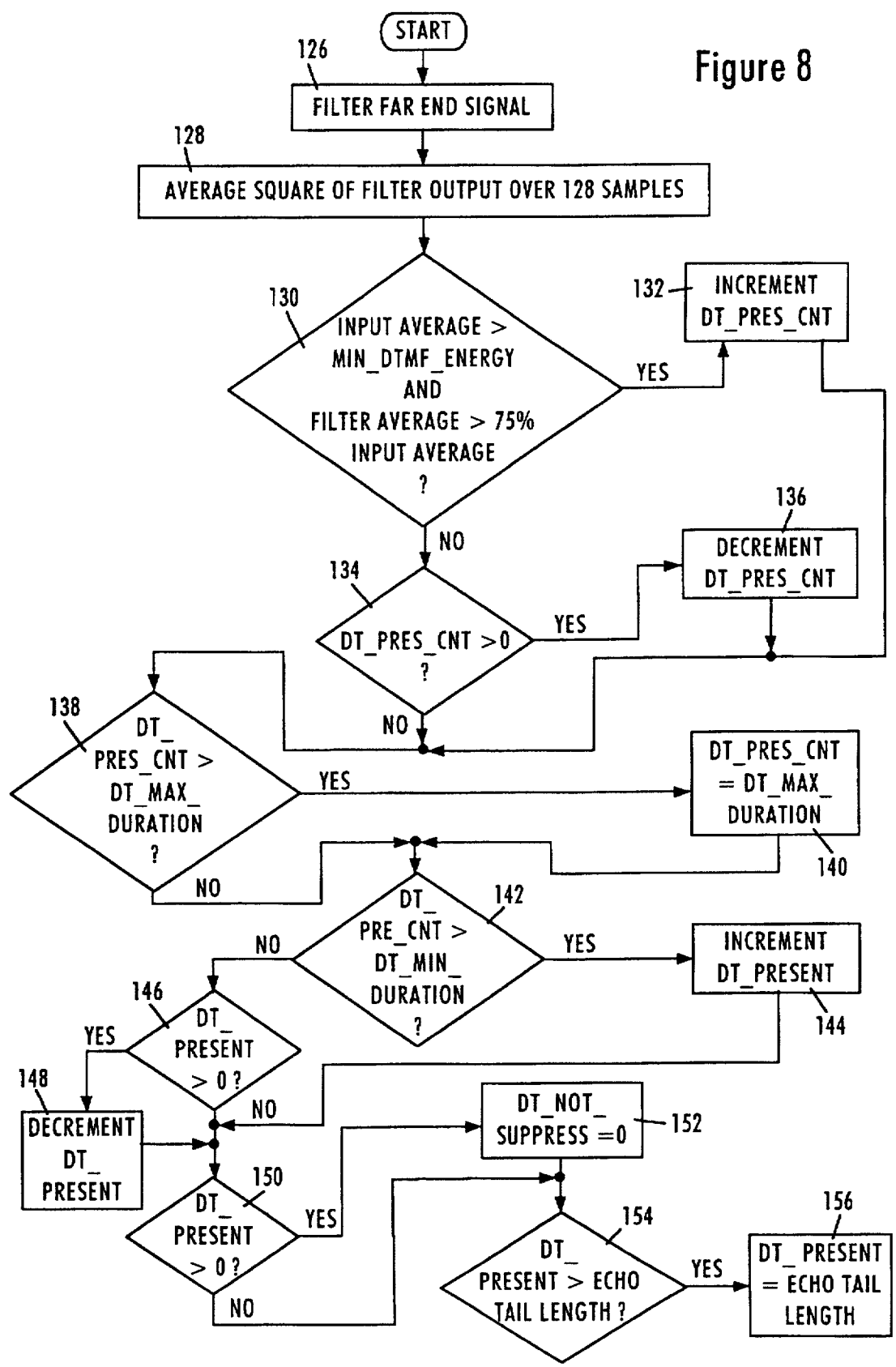
FIG. 8 is a flow diagram detailing a preferred dialtone detection process for use in the method of FIG. 3.

Referring now to FIG. 6, a preferred method of searching for a DTMF tone in a detector is illustrated. This detector is primarily in place to detect DTMF digits so as to prevent any DTMF echo from going back to the originating port of the tones. The detector is preferably composed of two sixth order bandpass filters. One filter has a passband from 700 Hz to 950 Hz, corresponding to the low frequency group, and the other has a passband from 1200 Hz to 1650 Hz. This detector runs continuously and looks only at the far end signal to search for tones.

The input signal is passed through the two filters. A running average of the squares of the input signal 84 is computed over 128 samples. The filters then filter 86 the signal and an average output power is measured 88 for each filter. Each sample represents a 20 millisecond window of information in the received signal. The maximum input energy since the last time the far end signal went below a predetermined minimum energy (min_dtmf_energy) is saved. As shown in FIG. 6, tests are performed before a tone is declared present. First, the average input energy must be greater 94 than the min_dtmf_energy threshold. In one embodiment, the minimum DTMF threshold is −25 dBm. The detector then compares 96 the sum of the two output power averages of the filters with the input power to determine if the sum is greater than 75% of the input. The next test in the series of tests run on the signal is to determine 98 if the filter average is greater than a minimum threshold (Min DTMF Filter energy) for each of the two filters. The filter averages for each filter are also measured to determine 100 if they are greater than min_percent_DTMF multiplied by the average input power.

The last test is verifying 102 that the twist between the two filters is within acceptable limits. Twist refers to the energy difference between the two filters. A positive twist (pos_twist) indicates that the energy on the higher frequency filter is lower than the energy on the lower frequency filter. A negative twist (Neg_twist) measures the opposite relationship, i.e. that the energy on the lower frequency filter is lower than the energy in the higher frequency filter. Preferably, the pos_twist and neg_twist ranges are +/−4 dB. If any of the above tests are false, the tone__present__cnt is greater than zero and tone present__cnt is 105 decremented. If all the above tests are true, tone__present__cnt is incremented 104.

After incrementing tone__present__cnt, or if 106 tone__present__cnt was less than or equal to zero, the detector compares 108 the tone__present__cnt value with a max__duration constant to see if the tone is within a predetermined duration range. If tone__present__cnt is greater than or equal to max__duration then tone__present__cnt is set 110 equal to max__duration. Otherwise, the detector determines 112 if tone__present__cnt is less than a minimum duration (min__duration). Dtmf__present is decremented 114 if the counter is less than min__duration. Otherwise, the detector determines 116 if dtmf__present is greater than echo__tail__length. If it is less than echo__tail__length, the dtmf__pres flag is incremented 118. Dtmf__suppress and dtmf__present flags are the outputs of the detector and are used by the echo suppressor for suppressing the near end echo.

Dialtone Detector

The final detector in the echo canceller is a dialtone detector. This detector can only be activated to look for a tone if the generic tone detector sees a tone in the far end signal. Preferably, the detector has a 4th order bandpass filter with a passband of 300 Hz to 500 Hz. While this is the usual frequency range of a dialtone, other ranges may be implemented according to system needs.

The dialtone detector is used to detect dialtone in the far end signal so that the echo suppressor may be disabled and the digits being dialed go through undistorted. As shown in FIG. 6, the far end signal is passed through the bandpass filter 126 and the running average of the square of the filter output over 128 samples is computed 128. Each sample is preferably a 125 microsecond window of information such that 128 samples are equal to 16 milliseconds of signal information. The decision making process within the dialtone detector begins with determining 130 if the input energy average is greater than a minimum threshold (min__dtmf__energy) and if the filter average is greater than 75% of the input energy average. If these tests are true, the dialtone detection counter (dt__pres__cnt) is incremented 132. Otherwise, the detector checks to see 134 if dt__pres__cnt is greater than zero. If it is greater than zero dt__pres__cnt is decremented 136.

Dt__pres__cnt is next compared 138 to a maximum dialtone duration constant (DT__MAX__DURATION). This constant may be varied by the system designer depending on the maximum delay the system is expected to handle. If dt__pres__cnt is greater than DT__MAX__DURATION, dt__pres__cnt is set 140 equal to DT__MAX__DURATION. If the dt__pres__cnt is greater than a minimum threshold 142 (DT__MIN__DURATION), dt__present is incremented 144. If the dt__pres__cnt is not greater than the minimum threshold 142 and the dt__present is greater than zero 146, dt__present is decremented 148. If dt__present is greater than zero 150, the dt__not__suppress flag is set to zero 152. The dr__not__suppress flag indicates to the echo canceller that at dialtone is present and should not be suppressed when dt__not__suppress=0. If dt__present is greater than echo tail length 154, then the dt__present flag is set equal to echo tail length 156. The outputs of the dialtone detector are dt__present and dt__not__suppress and are used by control module for disabling the suppressor.

As described above, each of the detector processes produces a flag indicative of specific results. From these flags, one flag called some__tone is obtained. Some__tone is the 'or' of the following three flags: tone__flag, dt__present and dtmf__present. If any one of the three flags is true (i.e., equal to 1), some__tone is true. The presently preferred method may be implemented in an echo canceller and be used to augment other standard methods of detecting double talk or other conditions in an echo canceller. The some__tone flag is typically used to control the echo suppressor in an echo canceller.

From the foregoing, a method for detecting narrow-band signals in an echo canceller has been described. The present method is designed to improve the efficiency of an echo canceller by searching for and identifying narrow-band signals in order to avoid undesired echoes and signal degradation that can result from the presence of those signals.

It is intended that the foregoing detailed description be regarded as illustrative rather than limiting, and that it be understood that the following claims, including all equivalents, are intended to define the scope of this invention.

What is claimed is:

1. A method of searching for narrow-band signals in signals at an echo canceller comprising the steps of:

searching for a generic tone in a near end and a far end signal over a predetermined period of time;

searching for a DTMF tone;

searching for a 2100 Hz tone;

searching for a dialtone if a generic tone is found; and setting flags indicative of a need to suppress an echo.

2. The method of claim 1 wherein the step of searching for a 2100 Hz tone comprises:

filtering an input signal to a filter to produce an output signal;

measuring average power in the input signal;

measuring average power of an output signal, said output signal filtered from the input signal; and comparing the average power in the input signal with the average power in the output signal.

3. The method of claim 2 wherein said filter is a bandpass filter having a passband centered at 2100 Hz.

4. The method of claim 2 wherein the steps of measuring average power at the input and output of the filter and comparing the average input and output power of the filter are repeated a plurality of times.

5. The method of claim 4 further comprising the step of detecting a 2100 Hz tone if the average power at the output of the filter is at least 80% of the input power at the filter in a majority of said repeated steps.

6. The method of claim 1 wherein searching for a DTMF tone further comprises:

providing a first filter having a first passband and a second filter having a second passband;

averaging the square of an input signal into said filters and the square of output signals from each of said filters over a predetermined time; and determining if a tone is present based on the averaging of the square of the input signal and the squares of the output signals.

7. The method of claim 6 further comprising providing to said echo canceller a further flag indicative of tone presence.

8. The method of claim 1 wherein the step of searching for a dialtone comprises:

receiving a signal at a bandpass filter, said bandpass filter having a pass band designed to pass a predetermined dialtone frequency range;

measuring an average output power at the filter and an average input power; and comparing the average output power at the filter with the average input power to determine the presence of a dialtone.

9. The method of claim 8 wherein the step of measuring the average input and output power further comprises measuring the input power and output power over a 20 millisecond period.

10. The method of claim 8 wherein the pass band of the bandpass filter comprises a frequency range of 300 Hz to 500 Hz.

11. The method of claim 8 further comprising providing a further flag representative of a dialtone presence.

12. A method of searching for narrow-band signals in signals at an echo canceller comprising the steps of:

searching for a generic tone in a near end and a far end signal over a predetermined period of time;

searching for a DTMF tone;

searching for a 2100 Hz tone; and searching for a dial tone if a generic tone is found;

wherein the step of searching for a generic tone comprises comparing a far end signal strength with a near end signal strength to determine a direction to search, measuring an average power and a peak power in said determined direction, and determining the presence of a tone based on the average power and peak power measurements.

13. A method of searching for narrow-band signals in signals at an echo canceller comprising the steps of:

searching for a generic tone in a near end and a far end signal over a predetermined period of time;

searching for a DTMF tone;

searching for a 2100 Hz tone; and searching for a dial tone when a generic tone is found, including the step of filtering a received signal using a pass band that passes a dial tone frequency range having a plurality of potential dial tone frequencies therein to produce a filtered signal, measuring an average power of the filtered signal and an average power of the received signal, and comparing the average power of the filtered signal with the average power of the received signal to determine the presence of a dial tone.

14. The method of claim 13 wherein the step of filtering a received signal includes the step of filtering a received signal using a pass band that passes a frequency range of 300 Hz to 500 Hz.

* * * * *